US012249759B2

(12) United States Patent
Enomoto et al.

(10) Patent No.: US 12,249,759 B2
(45) Date of Patent: Mar. 11, 2025

(54) RADOME FOR VEHICLE-MOUNTED RADAR DEVICE, AND VEHICLE-MOUNTED RADAR STRUCTURE

(71) Applicant: SANKEI GIKEN KOGYO CO., LTD., Tokyo (JP)

(72) Inventors: Takamasa Enomoto, Tokyo (JP); Hiroyuki Kobayashi, Tokyo (JP); Ryuho Ikemasu, Tokyo (JP); Shinpei Yamamoto, Tokyo (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 144 days.

(21) Appl. No.: 18/021,235

(22) PCT Filed: Jun. 23, 2021

(86) PCT No.: PCT/JP2021/023881
§ 371 (c)(1),
(2) Date: Feb. 14, 2023

(87) PCT Pub. No.: WO2022/038892
PCT Pub. Date: Feb. 24, 2022

(65) Prior Publication Data
US 2023/0299472 A1 Sep. 21, 2023

(30) Foreign Application Priority Data
Aug. 18, 2020 (JP) ................. 2020-137956

(51) Int. Cl.
*H01Q 1/32* (2006.01)
*H01Q 1/02* (2006.01)
*H01Q 1/42* (2006.01)

(52) U.S. Cl.
CPC ................. *H01Q 1/32* (2013.01); *H01Q 1/02* (2013.01); *H01Q 1/42* (2013.01)

(58) Field of Classification Search
CPC .. H01Q 1/02; H01Q 1/27; H01Q 1/32; H01Q 1/3208; H01Q 1/3241; H01Q 1/325;
(Continued)

(56) References Cited

U.S. PATENT DOCUMENTS 4,999,639 A * 3/1991 Frazita ............ H01Q 1/425
343/872
5,528,249 A * 6/1996 Gafford ........... H01Q 1/425
343/873
(Continued)

FOREIGN PATENT DOCUMENTS

JP 2003-57333 A 2/2003
JP 2018-66705 A 4/2018
JP 2018-66706 A 4/2018

OTHER PUBLICATIONS

International Search Report dated Sep. 7, 2021, issued in counterpart International Application No. PCT/JP2021/023881. (2 pages).
(Continued)

*Primary Examiner* — Jason M Crawford
(74) *Attorney, Agent, or Firm* — WHDA, LLP

(57) ABSTRACT

Disclosed is a radome 1 for vehicle-mounted radar devices including a base body 2 having an electromagnetic wave permeable substrate 3 and a heater wire 41 laminated on an inner surface side of the substrate 3 and wired in a surface direction of the substrate 3, in which linear portions 411 of the heater wire 41 are arranged side by side at intervals in the surface direction of the substrate 3 in an electromagnetic wave irradiation region R of the substrate 3, and a surface occupancy ratio of the linear portions 411 of the heater wire 41 in the electromagnetic wave irradiation region R of the substrate 3 is set to 1% or more and 24% or less. It is possible to exhibit a practical snow-melting function as a radome for vehicle-mounted radar devices while suppress-
(Continued)

ing attenuation of electromagnetic waves irradiated by a vehicle-mounted radar device within an allowable range.

15 Claims, 10 Drawing Sheets

(58) Field of Classification Search
CPC ........ H01Q 1/42; H01Q 1/425; H01Q 1/1278; H01Q 1/44; G01S 7/4047
See application file for complete search history.

(56) References Cited

U.S. PATENT DOCUMENTS

| | | | | |
|---|---|---|---|---|
| 6,175,335 | B1* | 1/2001 | Ishikawa | H01Q 15/08 343/753 |
| 6,674,392 | B1* | 1/2004 | Schmidt | G01S 13/931 343/873 |
| 2003/0052810 | A1 | 3/2003 | Artis et al. | |
| 2006/0086710 | A1* | 4/2006 | Meiler | H05B 3/265 219/202 |
| 2017/0352938 | A1* | 12/2017 | Okumura | H01Q 1/425 |
| 2019/0232886 | A1* | 8/2019 | Okumura | H01Q 1/422 |
| 2020/0371203 | A1* | 11/2020 | Hirotani | B60R 13/005 |
| 2021/0153307 | A1* | 5/2021 | Stablo | B29C 45/14639 |
| 2021/0155168 | A1* | 5/2021 | Hirotani | G09F 21/048 |
| 2021/0159592 | A1* | 5/2021 | Kawashima | G01S 7/03 |
| 2022/0163632 | A1* | 5/2022 | Kobayashi | G01S 7/4047 |
| 2022/0167467 | A1* | 5/2022 | Inaba | H01Q 1/422 |
| 2022/0320706 | A1* | 10/2022 | Huangfu | H01Q 1/3233 |
| 2022/0407214 | A1* | 12/2022 | Bouabdalli | G01S 7/4047 |
| 2023/0171855 | A1* | 6/2023 | Hirotani | H05B 3/16 219/202 |
| 2023/0243922 | A1* | 8/2023 | Hirotani | H01Q 1/02 219/202 |
| 2023/0291089 | A1* | 9/2023 | Kobayashi | H01Q 1/02 |
| 2023/0299472 | A1* | 9/2023 | Enomoto | H01Q 1/32 343/702 |
| 2024/0198928 | A1* | 6/2024 | Moriya | G01S 13/931 |

OTHER PUBLICATIONS

Ikemasu et al., "Optimum Pattern of Heater Element for Radome Achieving Enough Heating Ability and Millimeter Wave Transmissivity", Transactions of Society of Automotive Engineers of Japan, Mar. 2020, vol. 51, No. 2, pp. 323-327. Cited in ISR. (5 pages).

\* cited by examiner

RADOME FOR VEHICLE-MOUNTED RADAR DEVICE, AND VEHICLE-MOUNTED RADAR STRUCTURE

TECHNICAL FIELD

The present invention relates to a radome for vehicle-mounted radar devices provided on the front side of a vehicle-mounted radar device, and more particularly to a radome for vehicle-mounted radar devices having a snow-melting function and a vehicle-mounted radar structure having this radome.

BACKGROUND ART

Conventionally, as a radome for vehicle-mounted radar devices having a snow-melting function, PTLs 1 and 2 disclose a radome that can suppress attenuation when millimeter waves permeate therethrough while exhibiting a snow-melting function. This radome is configured to include a decorative main body portion having millimeter wave permeability and a linear heater wire. The heater wire has a plurality of linear portions extending in parallel to each other, and ends of adjacent linear portions are connected by an arc-shaped turned-back portion. A plurality of linear portions in a portion of the heater wire are arranged within a millimeter wave irradiation region. The area ratio of all the linear portions in the millimeter wave irradiation region is set to 10% or less so that the allowable value of attenuation of the millimeter waves is 2.5 dB or less.

Further, PTLs 1 and 2 disclose that, if the linear portion of the heater wire is parallel to the plane of polarization of millimeter waves, the millimeter waves may make surface contact with the linear portion of the heater wire, hindering permeation and attenuating the millimeter waves. PTLs 1 and 2 also disclose that, by arranging the linear portion of the heater wire perpendicular to the plane of polarization of the millimeter waves, the contact area of the millimeter waves with the linear portion of the heater wire can be minimized, and the amount of millimeter waves that are blocked from permeation can be decreased to minimize the attenuation of millimeter waves.

CITATION LIST

Patent Literature

[PTL 1] Japanese Patent Application Publication No. 2018-66705
[PTL 2] Japanese Patent Application Publication No. 2018-66706

SUMMARY OF INVENTIONS

Technical Problem

The radomes of PTLs 1 and 2 can suppress the attenuation of millimeter waves by setting the area ratio of the linear portion of the heater wire to the millimeter wave irradiation region to 10% or less. However, the installation amount of the heater wire necessary for exhibiting a practical snow-melting function as a radome for vehicle-mounted radar devices is not indicated. Thus, if the area ratio of the linear portion of the heater wire to the millimeter wave irradiation region is set to an arbitrary area ratio of 10% or less, a practical snow melting function may not be exhibited. Therefore, there is a demand for a radome having a structure capable of exhibiting a practical snow-melting function as a radome for vehicle-mounted radar devices while suppressing attenuation of electromagnetic waves irradiated by a vehicle-mounted radar device.

The present invention is proposed in view of the above problems, and an object thereof is to provide a radome for vehicle-mounted radar devices and a vehicle-mounted radar structure capable of exhibiting a practical snow-melting function as a radome for vehicle-mounted radar devices while suppressing attenuation of electromagnetic waves irradiated by a vehicle-mounted radar device within an allowable range.

Solution to Problem

A radome for vehicle-mounted radar devices according to the present invention includes a base body having an electromagnetic wave permeable substrate and a heater wire laminated on an inner surface side of the substrate and wired in a surface direction of the substrate, wherein linear portions of the heater wire are arranged side by side at intervals in the surface direction of the substrate in an electromagnetic wave irradiation region of the substrate, and a surface occupancy ratio of the linear portions of the heater wire in the electromagnetic wave irradiation region of the substrate is set to 1% or more and 24% or less.

According to this configuration, the surface occupancy ratio of the linear portions of the heater wire in the electromagnetic wave irradiation region of the substrate is set to 1% or more. Thus, even when the ambient temperature is −5° C. and the vehicle travels at a speed of 100 km/h, the temperature of the outer surface of the substrate can be kept above 0° C. Therefore, it is possible to exhibit the practical snow-melting function as the radome for vehicle-mounted radar devices while suppressing the attenuation of electromagnetic waves irradiated by the vehicle-mounted radar device within a required allowable range.

In the radome for vehicle-mounted radar devices of the present invention, the linear portion of the heater wire is arranged side by side so as to extend substantially perpendicularly to the plane of polarization of linearly polarized electromagnetic waves irradiated by the vehicle-mounted radar structure, and the surface occupancy ratio of the linear portions of the heater wire in the electromagnetic wave irradiation region is set to 1% or more and 24% or less.

According to this configuration, it is possible to exhibit a practical snow-melting function as the radome for vehicle-mounted radar devices. Moreover, the permeability of the base body with respect to the electromagnetic waves irradiated by the vehicle-mounted radar device can be ensured to be −1.5 dB or more, and the attenuation of the electromagnetic waves can be suppressed within an allowable range of practically sufficiently high levels.

In the radome for vehicle-mounted radar devices of the present invention, the linear portions of the heater wire are arranged side by side so as to extend substantially perpendicularly to a plane of polarization of linearly polarized electromagnetic waves irradiated by a vehicle-mounted radar device, and the surface occupancy ratio of the linear portions of the heater wire in the electromagnetic wave irradiation region of the substrate is set to 3% or more and 20% or less.

According to this configuration, even when the ambient temperature is −15° C. and the vehicle travels at a speed of 100 km/h, the temperature of the outer surface of the substrate can be kept above 0° C., and snow can be reliably melted from the radome for vehicle-mounted radar devices even in a more severe cold environment. In addition, the permeability of the base body with respect to the electromagnetic waves irradiated by the vehicle-mounted radar device can be ensured to be −1.0 dB or more, and the attenuation of the electromagnetic waves can be suppressed within an allowable range of practically sufficiently very high levels.

In addition, the radome may be configured such that the linear portions of the heater wire are arranged side by side so as to extend substantially perpendicularly to a plane of polarization of linearly polarized electromagnetic waves irradiated by a vehicle-mounted radar device, and the surface occupancy ratio of the linear portions of the heater wire in the electromagnetic wave irradiation region of the substrate is set to 1% or more and 20% or less. The radome may be configured such that the linear portions of the heater wire are arranged side by side so as to extend substantially perpendicularly to a plane of polarization of linearly polarized electromagnetic waves irradiated by a vehicle-mounted radar device, and the surface occupancy ratio of the linear portions of the heater wire in the electromagnetic wave irradiation region of the substrate is set to 3% or more and 24% or less.

In the radome for vehicle-mounted radar devices of the present invention, the linear portions of the heater wire are arranged side by side so as to extend substantially perpendicularly to a plane of polarization of linearly polarized electromagnetic waves irradiated by a vehicle-mounted radar device, and the surface occupancy ratio of the linear portions of the heater wire in the electromagnetic wave irradiation region of the substrate is set to 3% or more and 7.5% or less.

According to this configuration, even when the ambient temperature is −15° C. and the vehicle travels at a speed of 100 km/h, the temperature of the outer surface of the substrate can be kept above 0° C., and snow can be reliably melted from the radome for vehicle-mounted radar devices even in a more severe cold environment. In addition, the permeability of the base body with respect to the electromagnetic waves irradiated by the vehicle-mounted radar device can be ensured to be −0.35 dB or more, and very high electromagnetic wave permeability can be ensured.

In the radome for vehicle-mounted radar devices of the present invention, the linear portions of the heater wire are arranged side by side so as to extend substantially parallel to a plane of polarization of linearly polarized electromagnetic waves irradiated by a vehicle-mounted radar device, and the surface occupancy ratio of the linear portions of the heater wire in the electromagnetic wave irradiation region of the substrate is set to 1% or more and 16% or less.

According to this configuration, it is possible to exhibit a practical snow-melting function as the radome for vehicle-mounted radar devices. Moreover, the permeability of the base body with respect to the electromagnetic waves irradiated by the vehicle-mounted radar device can be ensured to be −1.5 dB or more, and the attenuation of the electromagnetic waves can be suppressed within an allowable range of practically sufficiently high levels.

In the radome for vehicle-mounted radar devices of the present invention, the linear portions of the heater wire are arranged side by side so as to extend substantially parallel to a plane of polarization of linearly polarized electromagnetic waves irradiated by a vehicle-mounted radar device, and the surface occupancy ratio of the linear portions of the heater wire in the electromagnetic wave irradiation region of the substrate is set to 3% or more and 13% or less.

According to this configuration, even when the ambient temperature is −15° C. and the vehicle travels at a speed of 100 km/h, the temperature of the outer surface of the substrate can be kept above 0° C., and snow can be reliably melted from the radome for vehicle-mounted radar devices even in a more severe cold environment. In addition, the permeability of the base body with respect to the electromagnetic waves irradiated by the vehicle-mounted radar device can be ensured to be −1.0 dB or more, and the attenuation of the electromagnetic waves can be suppressed within an allowable range of practically sufficiently very high levels.

In addition, the radome may be configured such that the linear portions of the heater wire are arranged side by side so as to extend substantially parallel to a plane of polarization of linearly polarized electromagnetic waves irradiated by a vehicle-mounted radar device, and the surface occupancy ratio of the linear portions of the heater wire in the electromagnetic wave irradiation region of the substrate is set to 1% or more and 13% or less. Moreover, the radome may be configured such that the linear portions of the heater wire are arranged side by side so as to extend substantially parallel to a plane of polarization of linearly polarized electromagnetic waves irradiated by a vehicle-mounted radar device, and the surface occupancy ratio of the linear portions of the heater wire in the electromagnetic wave irradiation region of the substrate is set to 3% or more and 16% or less.

In the radome for vehicle-mounted radar devices of the present invention, the heater wire is wired to be turned back in a meandering manner, and directions of currents flowing through the linear portions of the adjacent heater wires are made substantially anti-parallel to each other, and at least four linear portions of the heater wire are arranged side by side at a similar pitch in the electromagnetic wave irradiation region of the substrate.

According to this configuration, the directions of the currents flowing through the linear portions of the adjacent heater wires are made anti-parallel to each other, and the electromagnetic waves radiated from the adjacent heater wires have opposite phases. Thus, it is possible to cancel the electromagnetic radiations from the heater wires and obtain better electromagnetic wave permeable performance. In addition, at least four linear portions of the heater wire are arranged side by side at a similar pitch in the electromagnetic wave irradiation region of the substrate. Thus, it is possible to further equalize the temperature distribution in the entire electromagnetic wave irradiation region of the substrate to prevent the occurrence of a local region with a low temperature during heating with the heater wire, and to more reliably melt the snow over the entire electromagnetic wave irradiation region of the substrate.

In the radome for vehicle-mounted radar devices of the present invention, the heater wire is wired so as to be turned back in a meandering manner, and directions of currents flowing through the linear portions of the adjacent heater wires are substantially anti-parallel to each other, linear portions of the heater wire inside the electromagnetic wave irradiation region and linear portions of the heater wire outside the electromagnetic wave irradiation region adjacent to the linear portions are provided at a pitch similar to a pitch between the linear portions of the heater wire inside the electromagnetic wave irradiation region, and the linear portions of the heater wire outside the electromagnetic wave irradiation region extend by a length equal to or longer than a length in the electromagnetic wave irradiation region of the adjacent linear portions of the heater wire inside the electromagnetic wave irradiation region.

According to this configuration, the directions of the currents flowing through the linear portions of the adjacent heater wires are made anti-parallel to each other, and the electromagnetic waves radiated from the adjacent heater wires have opposite phases. Thus, it is possible to cancel the electromagnetic radiations from the heater wires and obtain better electromagnetic wave permeable performance. In addition, the linear portion of the heater wire inside the electromagnetic wave irradiation region and the linear portion of the heater wire outside the electromagnetic wave irradiation region adjacent to the linear portion of the heater wire inside the electromagnetic wave irradiation region are provided at a pitch that is similar to the pitch between the linear portions of the heater wire inside the electromagnetic wave irradiation region. The linear portions of the heater wire outside the electromagnetic wave irradiation region extend by a length equal to or longer than the length inside the electromagnetic wave irradiation region of the linear portions of the adjacent heater wires inside the electromagnetic wave irradiation region. Thus, the electromagnetic radiations from the linear portions of the heater wire inside the electromagnetic wave irradiation region positioned in the vicinity of the periphery of the electromagnetic wave irradiation region can be canceled with high reliability regardless of whether the number of linear portions arranged side by side in the electromagnetic wave irradiation region is an even number or an odd number, and better electromagnetic wave permeable performance can be obtained.

A vehicle-mounted radar structure of the present invention includes the radome for vehicle-mounted radar devices of the present invention, and a vehicle-mounted radar device that irradiates the radome for vehicle-mounted radar devices with linearly polarized electromagnetic waves.

According to this configuration, it is possible to obtain a vehicle-mounted radar structure that exhibits the effects of the radome for vehicle-mounted radar devices of the present invention.

Advantageous Effects of Invention

According to the present invention, it is possible to exhibit a practical snow-melting function as a radome for vehicle-mounted radar devices while suppressing attenuation of electromagnetic waves irradiated by the vehicle-mounted radar device within an allowable range.

DESCRIPTION OF EMBODIMENTS

[Radome for Vehicle-mounted Radar Devices of Embodiment]

Figure 1:
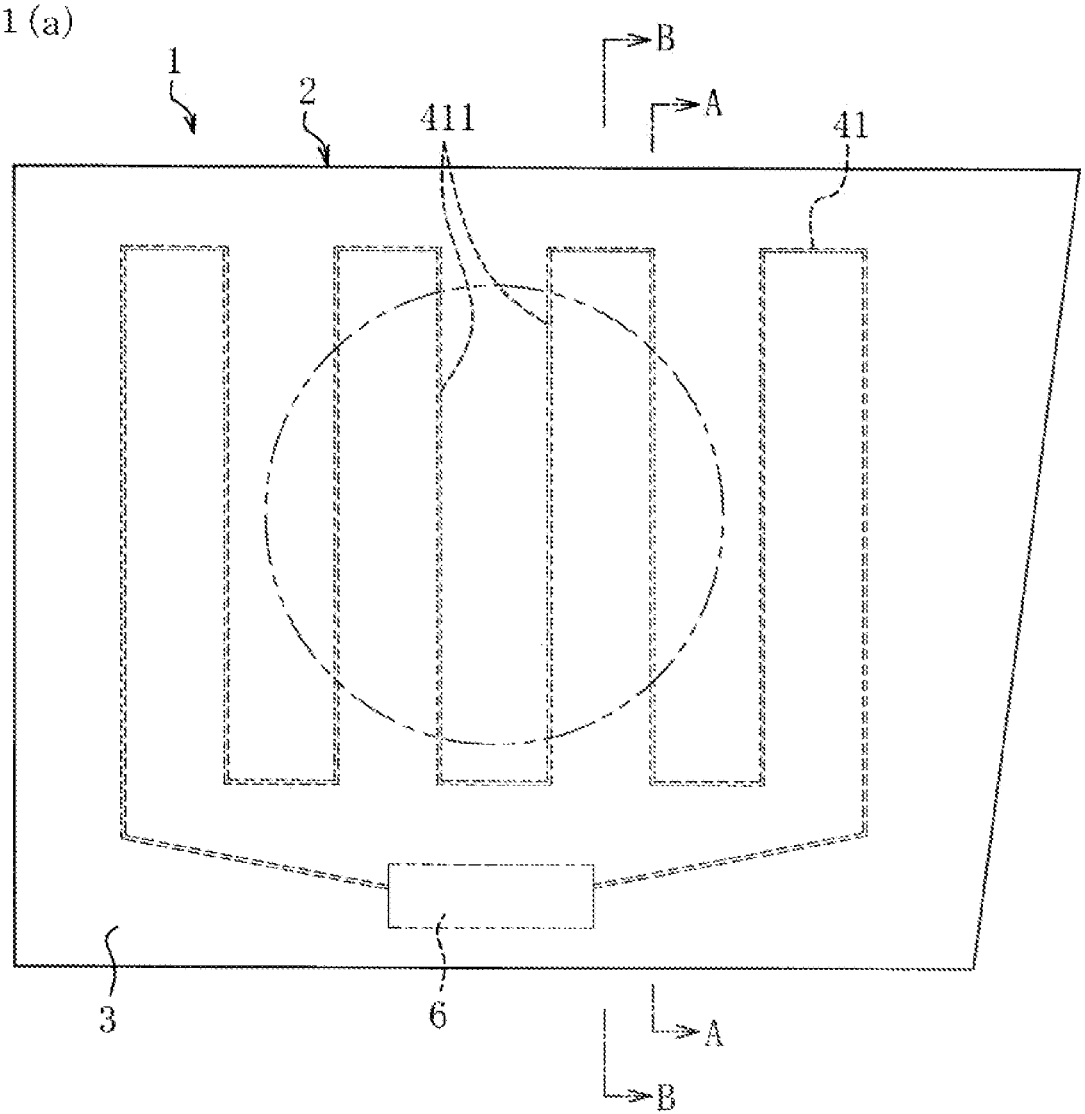
FIG. 1(a) is a front view of a radome for vehicle-mounted radar devices according to an embodiment of the present invention.
FIG. 1(b) is a partially enlarged view of FIG. 1(a).
Figure 1:
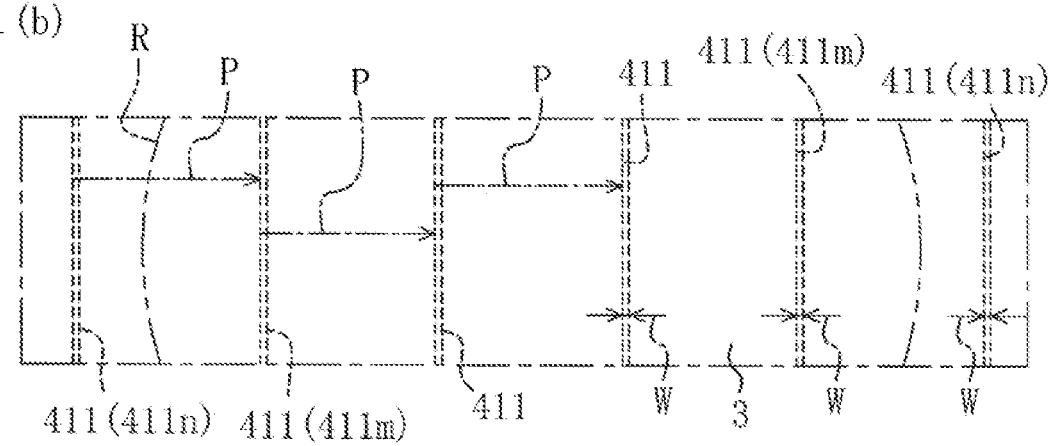
Figure 2:
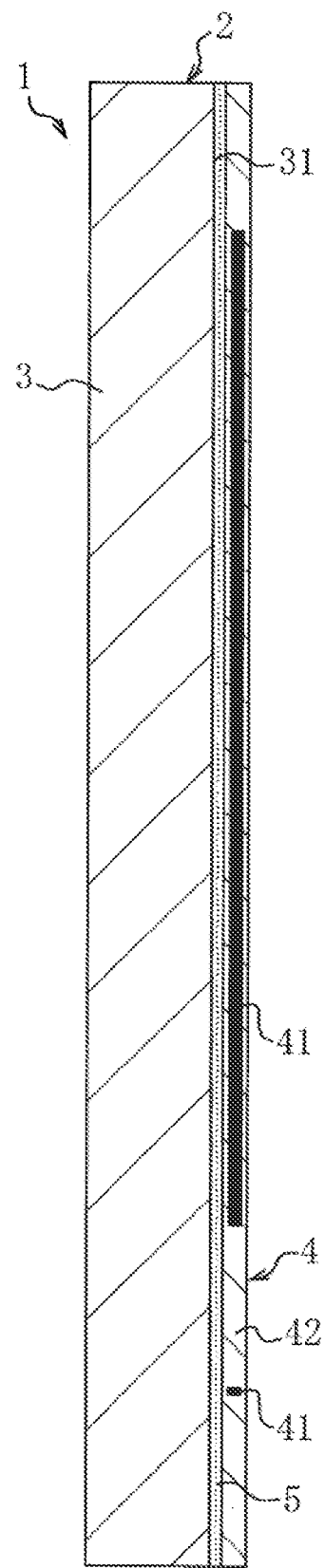
FIG. 2 is an enlarged cross-sectional view taken along line A-A of FIG. 1.
Figure 3:
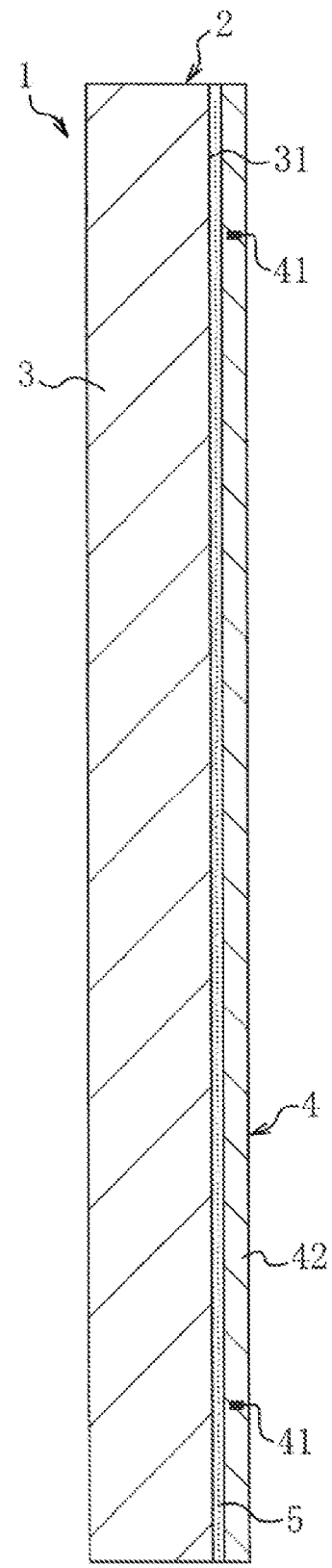
FIG. 3 is an enlarged cross-sectional view taken along line B-B of FIG. 1.

As shown in FIGS. 1 to 3, a radome 1 for vehicle-mounted radar devices according to an embodiment of the present invention has a base body 2. The base body 2 includes an electromagnetic wave permeable substrate 3 and a heater wire 41 laminated on an inner surface side of the substrate 3, that is a center side of a vehicle, and wired in the surface direction of the substrate 3. The substrate 3 can be made of any suitable material within the spirit of the scope of the present invention, such as a synthetic resin, glass, or ceramics, and preferably, the substrate 3 is made of an insulating synthetic resin.

The radome 1 of the illustrated example is a bumper cover attached to a vehicle bumper, and the substrate 3 is made of an insulating synthetic resin. When the substrate 3 is made of an insulating synthetic resin, the material is appropriately selected within an applicable range. For example, acrylonitrile-butadiene-styrene copolymer (ABS), polypropylene (PP), acrylic resins such as polymethyl methacrylate (PMMA), polycarbonate (PC), polyethylene terephthalate (PET), polyethylene (PE), acrylonitrile-styrene copolymer (AS), polystyrene (PS), cycloolefin polymer (COP), acrylonitrile-styrene-acrylate copolymer (ASA), or acrylonitrile-ethylene propyl rubber-styrene copolymer (AES) can be used alone or in combination of two or more, and the material may contain additives.

The heater wire 41 of the present embodiment constitutes a part of a heater sheet 4, and the heater sheet 4 is composed of the heater wire 41 and an electromagnetic wave permeable insulating film 42. The heater wire 41 of the illustrated example is entirely embedded in the planar insulating film 42 or is embedded so as to be exposed on the back side of the planar insulating film 42. The heater wire 41 can be made of any applicable appropriate conductive material such as nichrome wire, iron chromium, copper, silver, carbon fiber, or a transparent conductive film such as an ITO film. In addition, the insulating film 42 can be formed of any applicable appropriate insulating material having electromagnetic wave permeability. For example, an insulating synthetic resin such as polycarbonate (PC), polyethylene (PE), polypropylene (PP, OPP), polyethylene terephthalate (PET), polyethylene naphthalate (PEN), vinyl chloride (PVC), polystyrene (PS), acrylic (AC), or polyether ether Ketone (PEEK) is preferably used.

It should be noted that the heater sheet 4 can have an appropriate configuration within an applicable range other than the preferred configuration example in which the heater wire 41 is embedded in the planar insulating film 42. For example, the heater wire 41 may preferably be fixed to the back side or the inner surface side of the insulating film 42 positioned on the center side of the vehicle. In addition, the heater wire 41 may preferably be fixed to the back side or the inner surface side of the insulating film 42 positioned on the center side of the vehicle, and a protective film may be laminated and fixed onto the insulating film 42 so as to cover the heater wire 41 from the back side.

Both ends of the heater wire 41 are electrically connected to and mechanically fixed to a connector 6 at a lower part of the radome 1 for vehicle-mounted radar devices of the illustrated example. Electric power is supplied to the heater wire 41 through the connector 6 and an electric cable (not illustrated) connected thereto, and the heater wire 41 generates heat.

The heater wire 41 is formed so as to meander along the direction in which a back surface 31 of the substrate 3 expands or along the back surface 31, and is wired so as to turn back and extend in a series. In an electromagnetic wave irradiation region R of the substrate 3 and on the outer side thereof, linear portions 411 of the heater wire 41 are arranged side by side at intervals along the surface direction of the substrate 3 or along the back surface 31. The directions of currents flowing through the linear portions 411·411 of the adjacent heater wires 41 are set to be substantially anti-parallel or anti-parallel to each other. By setting the directions of the currents flowing through the linear portions 411 of the adjacent heater wires 41 to be substantially anti-parallel or anti-parallel to each other, the electromagnetic waves radiated from the linear portions 411 of the adjacent heater wires 41 have opposite phases, and the electromagnetic radiations from the linear portions 411 of the heater wire 41 are canceled. Thus, better electromagnetic wave permeable performance can be obtained. In the present embodiment, at least four linear portions 411 of the heater wire 41 are arranged side by side at a similar pitch P in the electromagnetic wave irradiation region R of the substrate 3. In the illustrated example, four linear portions 411 of the heater wire 41 are arranged side by side at a similar pitch P in the electromagnetic wave irradiation region R of the substrate 3.

Furthermore, in the present embodiment, a linear portion 411m of the heater wire 41 inside the electromagnetic wave irradiation region R of the substrate 3 and a linear portion 411n of the heater wire 41 outside the electromagnetic wave irradiation region R adjacent to the linear portion 411m are provided at a pitch P that is similar to the pitch P of the linear portions 411·411 of the heater wire 41 inside the electromagnetic wave irradiation region R. The linear portions 411n of the heater wire 41 outside the electromagnetic wave irradiation region R extend so as to be substantially anti-parallel by a length equal to or longer than the length inside the electromagnetic wave irradiation region R of the linear portions 411m of the adjacent heater wires 41 inside the electromagnetic wave irradiation region R. In the illustrated example, the pitch P between the linear portions 411m and 411n of the heater wire 41 is similar to the pitch P between the linear portions 411·411 of the heater wire 41 inside the electromagnetic wave irradiation region R. The linear portions 411n of the heater wire 41 extend substantially anti-parallel with substantially the same length as the linear portion 411m. The linear portions 411n extend outside the electromagnetic wave irradiation region R so as to be substantially anti-parallel by a length exceeding the length inside the electromagnetic wave irradiation region R of the linear portion 411m. The similar pitch P between the linear portions 411·411 of the heater wire 41 including the linear portions 411m·411n in the present embodiment means that (minimum pitch Pmin)/(middle pitch Pmid) is 0.80 or more and (maximum pitch Pmax)/(middle pitch Pmid) is 1.2 or less when Pmin is the minimum pitch, Pmax is the maximum pitch Pmax, and Pmid is the middle pitch which is the middle value between the minimum pitch Pmin and the maximum pitch Pmax.

Furthermore, in the radome 1 for vehicle-mounted radar devices of the present embodiment, in the electromagnetic wave irradiation region R of the substrate 3, the heater wire 41 is provided so that the surface occupancy ratio of the linear portions 411 of the heater wire 41 is set to be 1% or more and 24% or less.

When the present embodiment is applied to a vehicle-mounted radar structure in which the linear portions 411 of the heater wire 41 are arranged side by side so as to extend substantially perpendicularly or perpendicularly to the plane of polarization of linearly polarized electromagnetic waves irradiated by a vehicle-mounted radar device 10, which will be described later, it is preferable to set the surface occupancy ratio of the linear portions 411 of the heater wire 41 in the electromagnetic wave irradiation region R of the substrate 3 to 1% or more and 24% or less. As this configuration example, when the pitch P between the linear portions 411·411 of the heater wire 41 is 7.0 mm, the line width W of the linear portion 411 is set to 0.07 mm to 1.68 mm. More preferably, the surface occupancy ratio of the linear portions 411 of the heater wire 41 in the electromagnetic wave irradiation region R of the substrate 3 is set to 1% or more and 20% or less. Alternatively, the surface occupancy ratio of the linear portions 411 of the heater wire 41 in the electromagnetic wave irradiation region R of the substrate 3 is set to 3% or more and 24% or less. Alternatively, the surface occupancy ratio of the linear portions 411 of the heater wire 41 in the electromagnetic wave irradiation region R of the substrate 3 is set to 3% or more and 20% or less. As a configuration example in which the surface occupancy ratio of the linear portions 411 of the heater wire 41 in the electromagnetic wave irradiation region R of the substrate 3 is set to 3% or more and 20% or less, when the pitch P between the linear portions 411·411 of the heater wire 41 is set to 7.0 mm, the line width W of the linear portion 411 is set to 0.21 to 1.40 mm.

Further, when the present embodiment is applied to a vehicle-mounted radar structure in which the linear portions 411 of the heater wire 41 are arranged side by side so as to extend substantially parallel or parallel to the plane of polarization of linearly polarized electromagnetic waves irradiated by the vehicle-mounted radar device 10 described later, it is preferable to set the surface occupancy ratio of the linear portions 411 of the heater wire 41 in the electromagnetic wave irradiation region R of the substrate 3 to 1% or more and 16% or less. As this configuration example, when the pitch P between the linear portions 411·411 of the heater wire 41 is set to 7.0 mm, the line width W of the linear portion 411 is set to 0.07 to 1.12 mm. More preferably, the surface occupancy ratio of the linear portions 411 of the heater wire 41 in the electromagnetic wave irradiation region R of the substrate 3 is set to 1% or more and 13% or less. Alternatively, the surface occupancy ratio of the linear portions 411 of the heater wire 41 in the electromagnetic wave irradiation region R of the substrate 3 is set to 3% or more and 16% or less. Alternatively, the surface occupancy ratio of the linear portions 411 of the heater wire 41 in the electromagnetic wave irradiation region R of the substrate 3 is set to 3% or more and 13% or less. As a configuration example in which the surface occupancy ratio of the linear portions 411 of the heater wire 41 in the electromagnetic wave irradiation region R of the substrate 3 is set to 3% or more and 13% or less, when the pitch P between the linear portions 411·411 of the heater wire 41 is set to 7.0 mm, the line width W of the linear portion 411 is set to 0.21 to 0.91 mm.

In addition, as for the insulating film 42 or the insulating film 42 and the protective film when the protective film is laminated and fixed onto the insulating film 42, from the viewpoint of improving the electromagnetic wave permeable performance, it is preferable to use materials of which the refractive indices n defined based on complex permittivity match the refractive index of the substrate 3 or the refractive indices n are substantially the same as or close to the refractive index of the substrate 3. As for the numerical ranges of the close refractive indices n of the substrate 3 and the insulating film 42, the close refractive indices n of the substrate 3 and the protective film, and the refractive indices n of the insulating film 42 and the protective film, it is preferable that the difference between the refractive indices is in the range of 0 to 10%.

Here, the refractive index n is a quantity defined by Equation 1 from the real part of relative permittivity εr' and the imaginary part of relative permittivity εr". As for the materials of the substrate 3, the insulating film 42, and the protective film, it is preferable from the viewpoint of permeability that the magnitude of the dielectric tangent (loss tangent) tan δ defined as Equation 2 from the ratio of the imaginary part and the real part at the application frequency is 0.1 or less. The magnitude of the real part of the relative permittivity is preferably 3 or less. By setting the magnitudes of the dielectric tangent and the real part of the relative permittivity to these values or less, it is possible to reliably achieve reduction of the reflectivity and reduction of the internal loss required for the radome.

$$n = \sqrt{\frac{\varepsilon_r' + \sqrt{\varepsilon_r'^2 + \varepsilon_r''^2}}{2}} \quad [\text{Math. 1}]$$

$$\tan\delta = \frac{\varepsilon_r''}{\varepsilon_r'} \quad [\text{Math. 2}]$$

The heater sheet 4 in the present embodiment is fixed to the inner surface side or the back surface side of the substrate 3 via an adhesive layer 5. The adhesive layer 5 is made of an appropriate applicable electromagnetic wave permeable insulating material. For example, an adhesive such as methyl acrylate, ethyl acrylate, butyl acrylate, methyl methacrylate, ethyl methacrylate, or double-side tapes composed of a core material such as PET, polypropylene, acrylic foam, or the like and an adhesive such as acrylic adhesive or silicone adhesive, or double-side tapes composed of only the adhesive without the core material can be used. Instead of fixing the heater sheet 4 to the substrate 3 via the adhesive layer 5, the heater sheet 4 and the insulating film 42 may be welded and fixed to the substrate 3.

As for the adhesive layer 5, from the viewpoint of improving the electromagnetic wave permeable performance, it is preferable to use materials of which the refractive indices n defined based on complex permittivity match the refractive indices of the substrate 3 and the insulating film 42 or the substrate 3, the insulating film 42, and the protective film, or the refractive indices n are substantially the same as or close to the refractive indices of the substrate 3 and the insulating film 42 or the substrate 3, the insulating film 42, and the protective film. As for the numerical ranges of the close refractive indices n of the adhesive layer 5 and the substrate 3, the close refractive indices n of the adhesive layer 5 and the insulating film 42, and the close refractive indices n of the adhesive layer 5 and the protective film, it is preferable that the difference between the refractive indices is in the range of 0 to 10%. Here, the refractive index n is a quantity defined by Equation 1 from the real part of relative permittivity εr' and the imaginary part of relative permittivity εr". As for the materials of the adhesive layer 5, it is preferable from the viewpoint of permeability that the magnitude of the dielectric tangent (loss tangent) tan δ defined as Equation 2 from the ratio of the imaginary part and the real part at the application frequency is 0.1 or less. The magnitude of the real part of the relative permittivity is preferably 3 or less.

Figure 4:
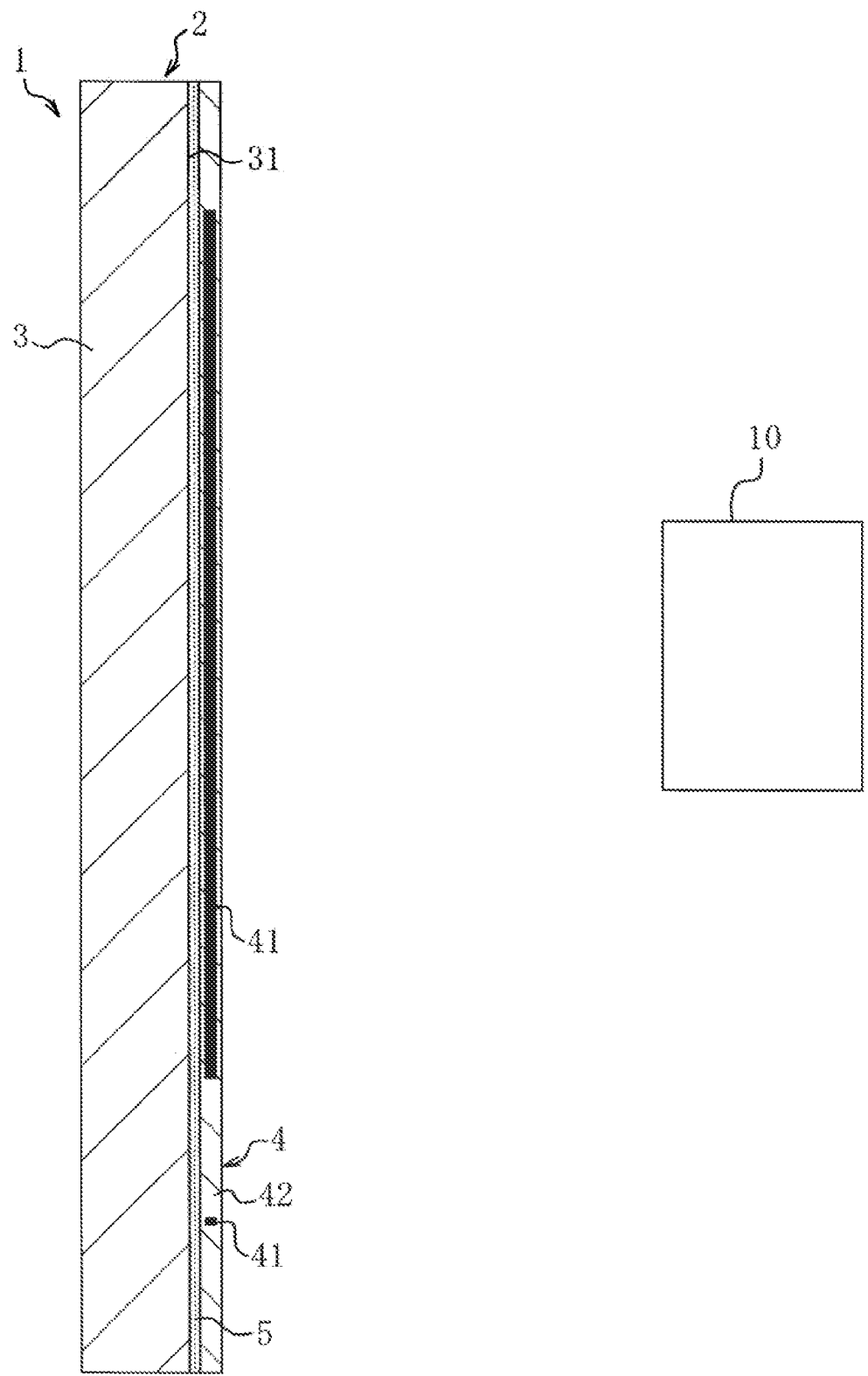
FIG. 4 is an explanatory diagram of a vehicle-mounted radar structure including the radome for vehicle-mounted radar devices according to the embodiment.

As shown in FIG. 4, the radome 1 for vehicle-mounted radar devices is arranged in front of the vehicle-mounted radar device 10 arranged on the center side of the vehicle and attached to the vehicle to form the vehicle-mounted radar structure. The vehicle-mounted radar device 10 irradiates the radome 1 for vehicle-mounted radar devices with linearly polarized electromagnetic waves. The wavelength or frequency of the electromagnetic waves irradiated by the vehicle-mounted radar device 10 is appropriately determined as necessary. For example, millimeter waves in the 76/77 GHz band from 76.0 to 77.0 GHz and millimeter waves in the 76/79 GHz band from 76.0 to 79.0 GHz are used.

Figure 5:
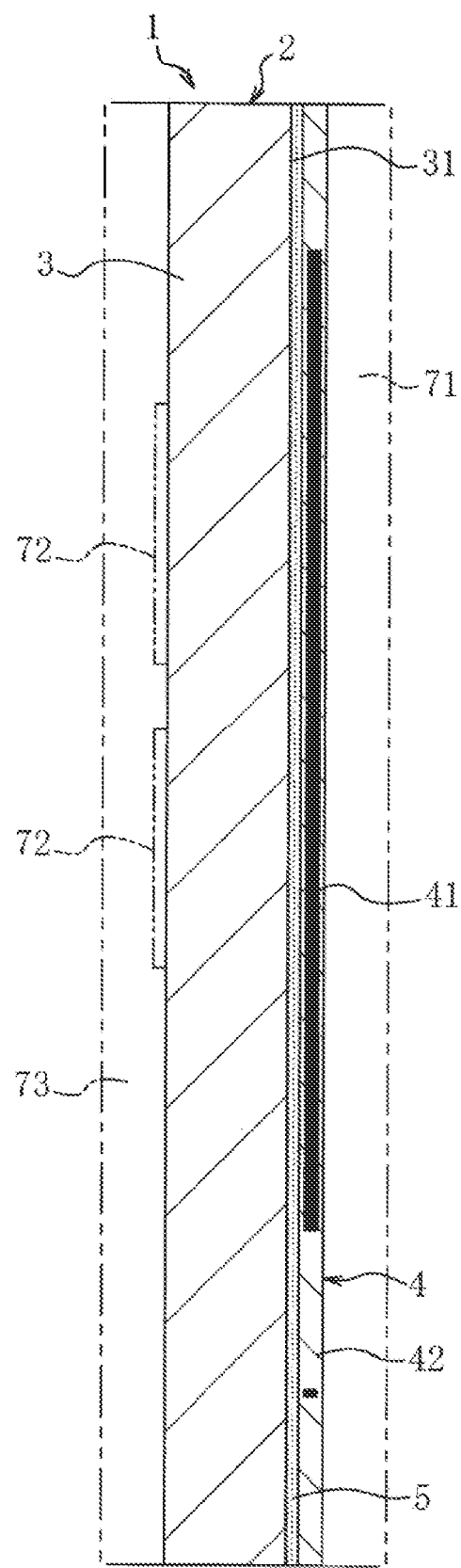
FIG. 5 is an explanatory cross-sectional view for explaining a modification of the radome for vehicle-mounted radar devices according to the embodiment.

Although the radome 1 for vehicle-mounted radar devices in the illustrated example is a bumper cover, the radome for vehicle-mounted radar devices according to the present invention can be configured as an appropriate vehicle-mounted component such as an emblem-shaped radome. Further, on the base body 2 of the radome 1 for vehicle-mounted radar devices, an appropriate laminated material may be additionally arranged in the normal direction of the substrate 3 as necessary. For example, in a bumper covershaped or emblem-shaped radome, an electromagnetic wave permeable rear substrate 71 may be laminated on the inner surface side or the back surface side of the substrate 3 on the center side of the vehicle, and fixed to the heater sheet 4 by adhesion or welding. Moreover, an electromagnetic wave permeable decorative layer 72 and a transparent substrate 73, or the transparent substrate 73 may be laminated on the outer surface side or the front surface side of the substrate 3 on the outer surface side of the vehicle and fixed to the substrate 3 by adhesion or welding (see FIG. 5).

At this time, it is preferable that the difference between the refractive index of the rear substrate 71, the refractive index of the substrate 3, the refractive index of the insulating film 42 of the heater sheet 4, or the refractive indices of the insulating film 42 and the protective film, and the refractive index of the adhesive layer 5 when the adhesive layer 5 is interposed is in the range of 0 to 10%. In addition, it is preferable that the difference between the refractive index of the transparent substrate 73, the refractive index of the substrate 3, the refractive index of the insulating film 42 of the heater sheet 4, or the refractive indices of the insulating film 42 and the protective film, and the refractive index of the adhesive layer 5 when the adhesive layer 5 is interposed is in the range of 0 to 10%. As for the material of the rear substrate 71 and the material of the transparent substrate 73, it is preferable that the magnitude of the dielectric tangent (loss tangent) tan δ defined as Equation 2 is 0.1 or less. Further, the magnitude of the real part of the relative permittivity is preferably 3 or less. The electromagnetic wave permeable decorative layer can be appropriately configured within the spirit of the scope of the present invention. For example, the decoration layer may be composed of a discontinuous metal film divided into islands by cracks and having integral visibility and a colored portion, or the decorative layer may be composed only of a discontinuous metal film.

According to the radome 1 for vehicle-mounted radar devices of the present embodiment, the surface occupancy ratio of the linear portions 411 of the heater wire 41 in the electromagnetic wave irradiation region R of the substrate 3 is set to 1% or more. Thus, even when the ambient temperature is −5° C. and the vehicle travels at a speed of 100 km/h, the temperature of the outer surface of the substrate 3 can be kept above 0° C. Therefore, it is possible to exhibit the practical snow-melting function as the radome 1 for vehicle-mounted radar devices while suppressing the attenuation of electromagnetic waves irradiated by the vehicle-mounted radar device 10 within a required allowable range.

In addition, when the linear portions 411 of the heater wire 41 are arranged side by side so as to extend substantially perpendicularly to the plane of polarization of linearly polarized electromagnetic waves irradiated by the vehicle-mounted radar device 10, and the surface occupancy ratio of the linear portions 411 of the heater wire 41 in the electromagnetic wave irradiation region R of the substrate 3 is set to 1% or more and 24% or less, it is possible to exhibit a practical snow-melting function as the radome 1 for vehicle-mounted radar devices. Moreover, the permeability of the base body 2 with respect to the electromagnetic waves irradiated by the vehicle-mounted radar device 10 can be ensured to be −1.5 dB or more, and the attenuation of the electromagnetic waves can be suppressed within an allowable range of practically sufficiently high levels.

In addition, when the linear portions 411 of the heater wire 41 are arranged side by side so as to extend substantially perpendicularly to the plane of polarization of linearly polarized electromagnetic waves irradiated by the vehicle-mounted radar device 10, and the surface occupancy ratio of the linear portions 411 of the heater wire 41 in the electromagnetic wave irradiation region R of the substrate 3 is set to 3% or more and 20% or less, even when the ambient temperature is −15° C. and the vehicle travels at a speed of 100 km/h, the temperature of the outer surface of the substrate 3 can be kept above 0° C., and snow can be reliably melted from the radome 1 for vehicle-mounted radar devices even in a more severe cold environment. In addition, the permeability of the base body 2 with respect to the electromagnetic waves irradiated by the vehicle-mounted radar device 10 can be ensured to be −1.0 dB or more, and the attenuation of the electromagnetic waves can be suppressed within an allowable range of practically sufficiently very high levels.

In addition, when the linear portions 411 of the heater wire 41 are arranged side by side so as to extend substantially parallel to the plane of polarization of linearly polarized electromagnetic waves irradiated by the vehicle-mounted radar device 10, and the surface occupancy ratio of the linear portions 411 of the heater wire 41 in the electromagnetic wave irradiation region R of the substrate 3 is set to 1% or more and 16% or less, it is possible to exhibit a practical snow-melting function as the radome 1 for vehicle-mounted radar devices. Moreover, the permeability of the base body 2 with respect to the electromagnetic waves irradiated by the vehicle-mounted radar device 10 can be ensured to be −1.5 dB or more, and the attenuation of the electromagnetic waves can be suppressed within an allowable range of practically sufficiently high levels.

In addition, when the linear portions 411 of the heater wire 41 are arranged side by side so as to extend substantially parallel to the plane of polarization of linearly polarized electromagnetic waves irradiated by the vehicle-mounted radar device 10, and the surface occupancy ratio of the linear portions 411 of the heater wire 41 in the electromagnetic wave irradiation region R of the substrate 3 is set to 3% or more and 13% or less, even when the ambient temperature is −15° C. and the vehicle travels at a speed of 100 km/h, the temperature of the outer surface of the substrate 3 can be kept above 0° C., and snow can be reliably melted from the radome 1 for vehicle-mounted radar devices even in a more severe cold environment. In addition, the permeability of the base body 2 with respect to the electromagnetic waves irradiated by the vehicle-mounted radar device 10 can be ensured to be −1.0 dB or more, and the attenuation of the electromagnetic waves can be suppressed within an allowable range of practically sufficiently very high levels.

Further, according to the radome 1 for vehicle-mounted radar devices, the directions of the currents flowing through the linear portions 411·411 of the adjacent heater wires 41 are made anti-parallel to each other, and the electromagnetic waves radiated from the adjacent heater wires have opposite phases. Thus, it is possible to cancel the electromagnetic radiations from the heater wires 41 and obtain better electromagnetic wave permeable performance. In addition, at least four linear portions 411 of the heater wire 41 are arranged side by side at a similar pitch P in the electromagnetic wave irradiation region R of the substrate 3. Thus, it is possible to further equalize the temperature distribution in the entire electromagnetic wave irradiation region R of the substrate 3 to prevent the occurrence of a local region with a low temperature during heating with the heater wire, and to more reliably melt the snow over the entire electromagnetic wave irradiation region R of the substrate 3.

In addition, the linear portion 411m of the heater wire 41 inside the electromagnetic wave irradiation region R and the linear portion 411n of the heater wire 41 outside the electromagnetic wave irradiation region R adjacent to the linear portion 411m are provided at a pitch that is similar to the pitch between the linear portions 411·411 of the heater wire 41 inside the electromagnetic wave irradiation region R. The linear portions 411n of the heater wire 41 outside the electromagnetic wave irradiation region R extend by a length equal to or longer than the length inside the electromagnetic wave irradiation region R of the linear portions 411m of the adjacent heater wires 41 inside the electromagnetic wave irradiation region R. Thus, the electromagnetic radiations from the linear portions 411m of the heater wire 41 inside the electromagnetic wave irradiation region R positioned in the vicinity of the periphery of the electromagnetic wave irradiation region R can be canceled with high reliability regardless of whether the number of linear portions 411 arranged side by side in the electromagnetic wave irradiation region R is an even number or an odd number, and better electromagnetic wave permeable performance can be obtained.

[Experimental Example on Heater Wire Surface Occupancy Ratio, Electromagnetic Wave Permeability and Snow-melting Performance]

Figure 6:
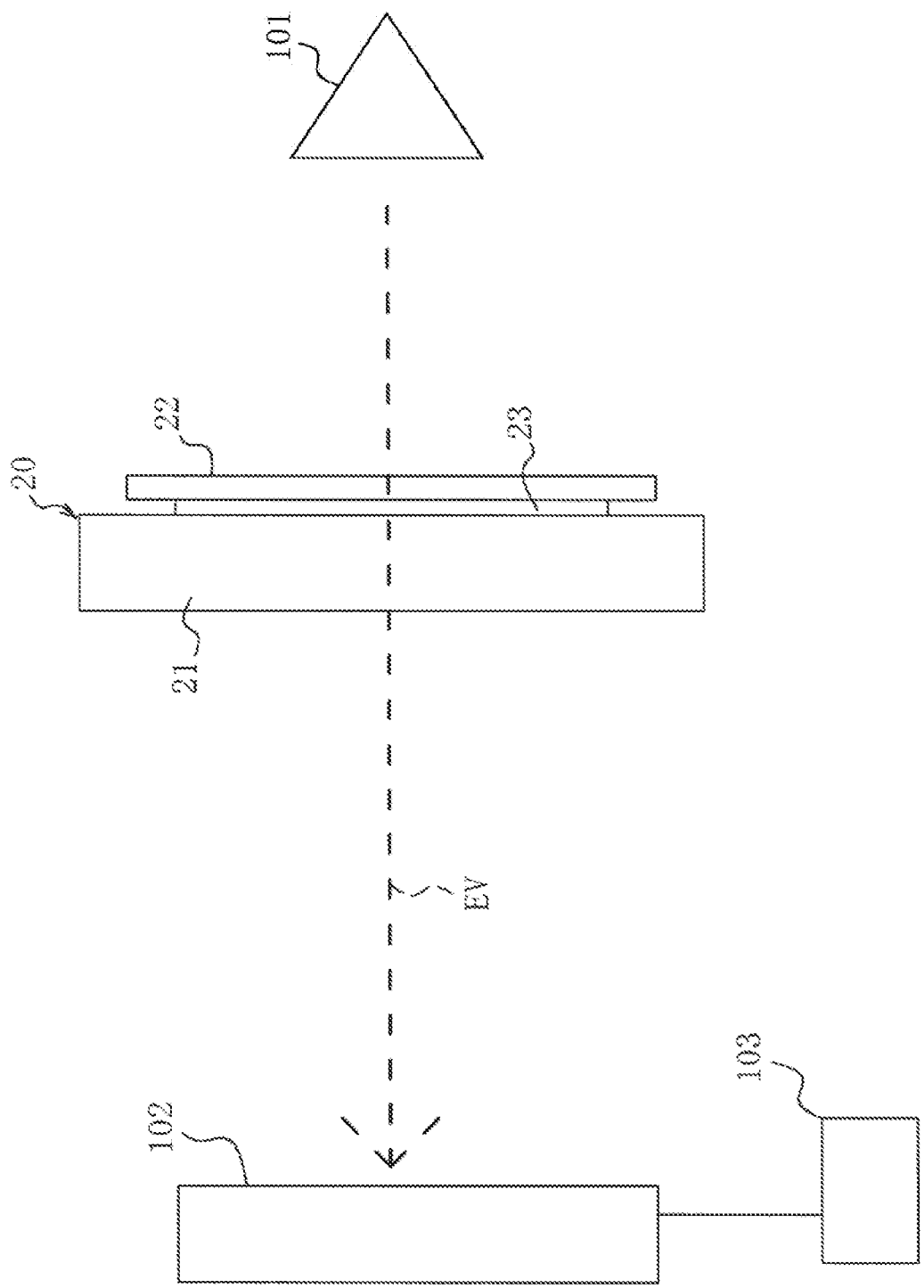
FIG. 6 is a schematic diagram of a measuring device of an experimental example for measuring the relationship between the surface occupancy ratio of a heater wire in an electromagnetic wave irradiation region and the electromagnetic wave permeability.
Figure 7:
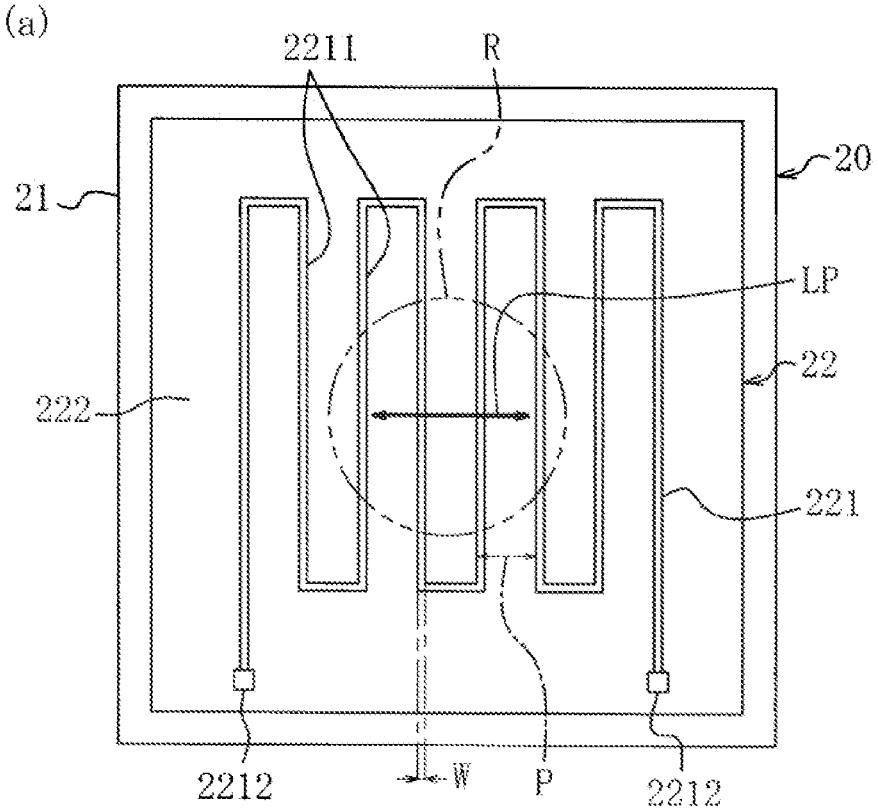
FIG. 7(a) is a schematic diagram for explaining a state in which a sample is irradiated with electromagnetic waves with the plane of polarization of linearly polarized waves perpendicular to a linear portion of a heater wire of the sample used in the experimental example.
FIG. 7(b) is a schematic diagram for explaining a state in which the sample is irradiated with electromagnetic waves with the plane of polarization of linearly polarized waves parallel to the linear portion of the heater wire of the sample used in the experimental example.
Figure 7:
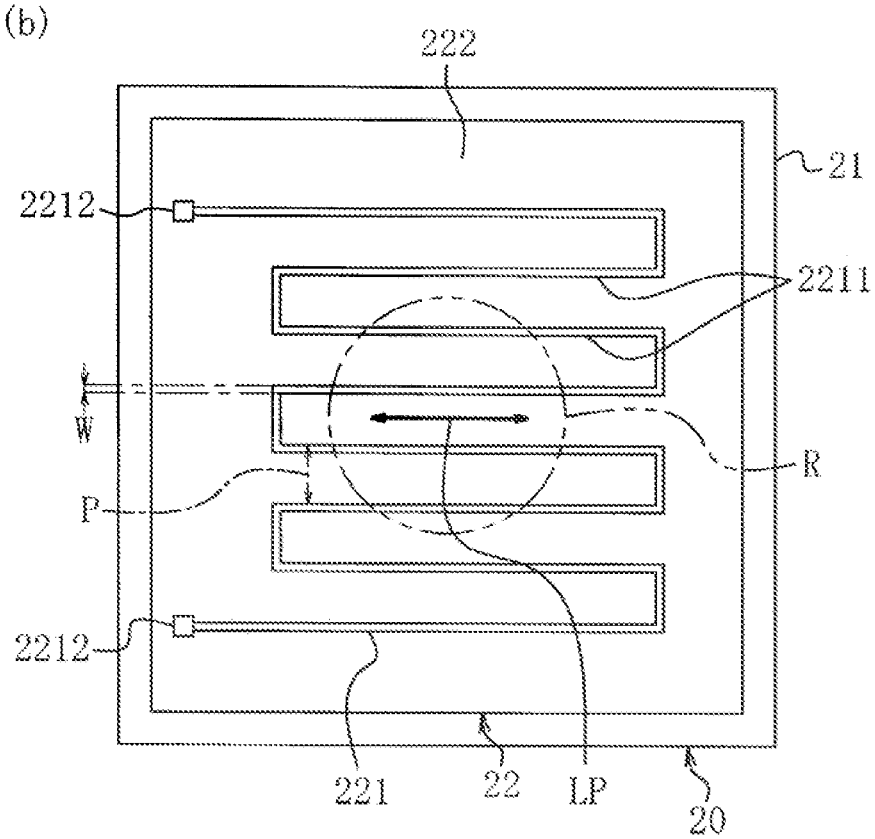

A sample 20 shown in FIGS. 6 and 7 was prepared as a sample corresponding to the base body of the radome for vehicle-mounted radar devices of the present invention and the base body 2 of the radome 1 for vehicle-mounted radar devices of the above-described embodiment and an experiment for verifying the electromagnetic wave permeability and an experiment for verifying the snow-melting performance were conducted using the sample 20. The sample 20 is composed of a substrate 21 corresponding to the substrate 3, a heater sheet 22 corresponding to the heater sheet 4, and a double-sided tape 23 corresponding to the adhesive layer 5. The double-sided tape 23 and the heater sheet 22 are laminated in this order on the back surface side or the inner surface side of the substrate 21 where electromagnetic waves are irradiated, and the heater sheet 22 is fixed to the substrate 21 via the double-sided tape 23.

The substrate 21 is a flat plate with a thickness of 2.2 mm, the double-sided tape 23 is planar with a thickness of 0.1 mm, and the heater sheet 22 is planar with a thickness of 0.1 mm. The total thickness of the approximately flat plate-shaped sample in which these members are laminated is 2.4 mm. The substrate 21 is a resin plate made of an ABS resin, and more specifically, is made of a heat-resistant ABS resin (MTH-2) manufactured by NIPPON A&L INC. This ABS (MTH-2) has a complex permittivity ε' of 2.656 and a dielectric tangent tan δ of 0.0065 for electromagnetic waves (millimeter waves) in the 76/77 GHz band at room temperature (approximately 25° C.)

The heater sheet 22 is configured such that the heater wire 221 and its terminal 2212 are exposed on the back surface side of the insulating film 222, and the heater wire 221 is embedded in an insulating film 222. The insulating film 222 is a polyimide film, and the heater wire 221 is a copper wire (resistivity: $1.69 \times 10^{-8}$ Ω·m). The polyimide film, which is the insulating film 222, has a complex permittivity ε' of 3.247 and a dielectric tangent tan δ of 0.0054 with respect to electromagnetic waves (millimeter waves) in the 76/77 GHz band at room temperature (approximately 25° C.). In addition, the heater wire 221 is formed so as to meander along the insulating film 222 and is wired so as to turn back and extend in a series, and the linear portions 2211 are arranged side by side at intervals along the insulating film 222. The pitch P between the linear portions 2211 2211 of the heater wire 221 of the sample 20 is 7.0 mm, and the pitches P between the linear portions 2211 2211 are all the same.

The double-sided tape 23 is composed of an acrylic adhesive without a core material, and has a complex permittivity ε' of 2.513 and a dielectric tangent tan δ of 0.0139 for electromagnetic waves (millimeter waves) in the 76/77 GHz band at room temperature (approximately 25° C.)

The measurement of the experiment for verifying the electromagnetic wave permeability using the sample 20 was performed using a Quality Automobile Radome Tester (QAR) manufactured by ROHDE & SCHWARZ as a measuring device. In the schematic diagram of FIG. 6 of this measuring device, 101 is an electromagnetic wave transmitter, 102 is a receiver, and 103 is an evaluation device. The electromagnetic waves transmitted from the electromagnetic wave transmitter 101 used for the measurement are millimeter waves in the 76/77 GHz band. EW is the propagation direction of the millimeter waves.

Then, the sample 20 was irradiated with electromagnetic waves from the electromagnetic wave transmitter 101 so that R shown in FIG. 7 is the electromagnetic wave irradiation region. The electromagnetic wave permeability was measured when electromagnetic waves were irradiated so that the plane of polarization LP of linearly polarized waves of millimeter waves in the 76/77 GHz band is perpendicular to the linear portion 2211 of the heater wire 221 of the sample 20 (see FIG. 7(a)). Moreover, the electromagnetic wave permeability was measured when electromagnetic waves were irradiated so that the plane of polarization LP of linearly polarized waves of millimeter waves in the 76/77 GHz band is parallel to the linear portion 2211 of the heater wire 221 of the sample 20 (see FIG. 7(b)).

In the measurement of the electromagnetic wave permeability, for each of the case where the plane of polarization LP is perpendicular to the linear portion 2211 and the case where the plane of polarization LP is parallel to the linear portion 2211, the measurement was performed by changing the line width W of the linear portion 2211 to change the occupancy ratio of the heater wire 221 or the linear portion 2211 with respect to the entire area of the electromagnetic wave irradiation region R while maintaining the pitch of 7.0 mm without energizing the heater wire 221. The measurement results are shown in FIG. 8.

Figure 8:
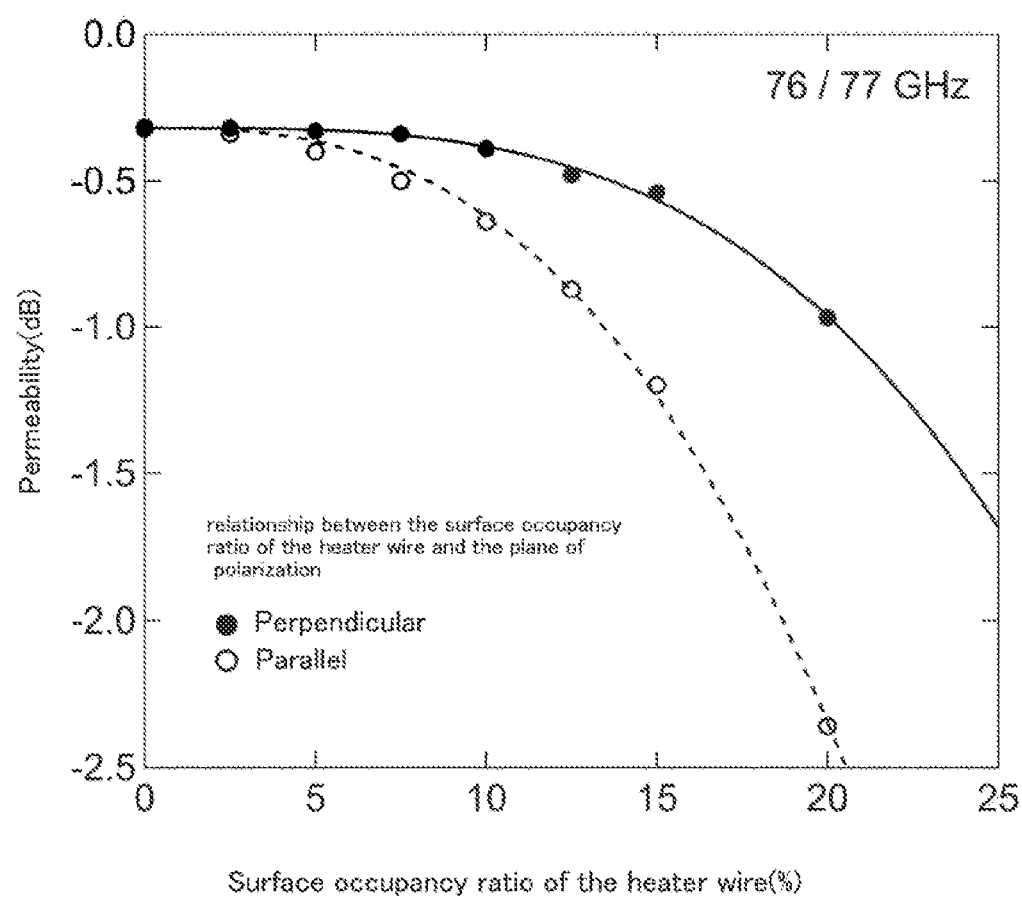
FIG. 8 is a graph of an experimental example showing the relationship between the surface occupancy ratio of the heater wire and the electromagnetic wave permeability when the sample is irradiated with electromagnetic waves with the plane of polarization of linearly polarized electromagnetic waves perpendicular to and parallel to the linear portion of the heater wire.

According to FIG. 8, when the allowable value of the attenuation of electromagnetic wave permeation of the sample 20 corresponding to the base body of the radome for vehicle-mounted radar devices is −1.5 dB or more, it can be seen that the allowable value can be achieved when the surface occupancy ratio of the linear portions 2211 of the heater wire 221 in the electromagnetic wave irradiation region R of the substrate 21 is set to 24% or less in a structure in which the plane of polarization LP of linearly polarized electromagnetic waves is perpendicular to the linear portion 2211 of the heater wire 221. Further, it can be seen that a similar allowable value can be achieved when the surface occupancy ratio of the linear portions 2211 of the heater wire 221 in the electromagnetic wave irradiation region R of the substrate 21 is set to 16% or less in the structure in which the plane of polarization LP of linearly polarized electromagnetic waves is parallel with the linear portion 2211 of the heater wire 221.

Further, when the allowable value of the attenuation of electromagnetic wave permeation of the sample 20 corresponding to the base body of the radome for vehicle-mounted radar devices is −1.0 dB or more, it can be seen that the allowable value can be achieved when the surface occupancy ratio of the linear portions 2211 of the heater wire 221 in the electromagnetic wave irradiation region R of the substrate 21 is set to 20% or less in a structure in which the plane of polarization LP of linearly polarized electromagnetic waves is perpendicular to the linear portion 2211 of the heater wire 221. Further, it can be seen that a similar allowable value can be achieved when the surface occupancy ratio of the linear portions 2211 of the heater wire 221 in the electromagnetic wave irradiation region R of the substrate 21 is set to 13% or less in the structure in which the plane of polarization LP of linearly polarized electromagnetic waves is parallel with the linear portion 2211 of the heater wire 221.

Furthermore, in the structure in which the plane of polarization LP of linearly polarized electromagnetic waves is perpendicular to the linear portion 2211 of the heater wire 221, it can be seen that the electromagnetic wave permeability was −0.4 dB or more when the surface occupancy ratio of the linear portions 2211 of the heater wire 221 in the electromagnetic wave irradiation region R of the substrate 21 was 10% or less, and the electromagnetic wave permeability was −0.35 dB or more when the surface occupancy ratio of the linear portions 2211 of the heater wire 221 in the electromagnetic wave irradiation region R of the substrate 21 was 7.5% or less. Thus, very high electromagnetic wave permeability can be achieved.

Further, in the experiment for verifying the snow-melting performance using the sample 20, the experiment was performed such that the sample 20 was installed in front of the vehicle with the traveling direction of the vehicle as the front side, the heater wire 221 of the sample 20 was energized with an input voltage of 10 V, and the vehicle speed was set to 100 km/h. Moreover, the experiment was performed for an ambient temperature of −5° C. and an ambient temperature of −15° C. by changing the line width W of the linear portion 2211 to change the occupancy ratio of the heater wire 221 or the linear portions 2211 with respect to the entire area of the electromagnetic wave irradiation region R while maintaining the pitch of 7.0 mm. The measurement results are shown in FIG. 9.

Figure 9:
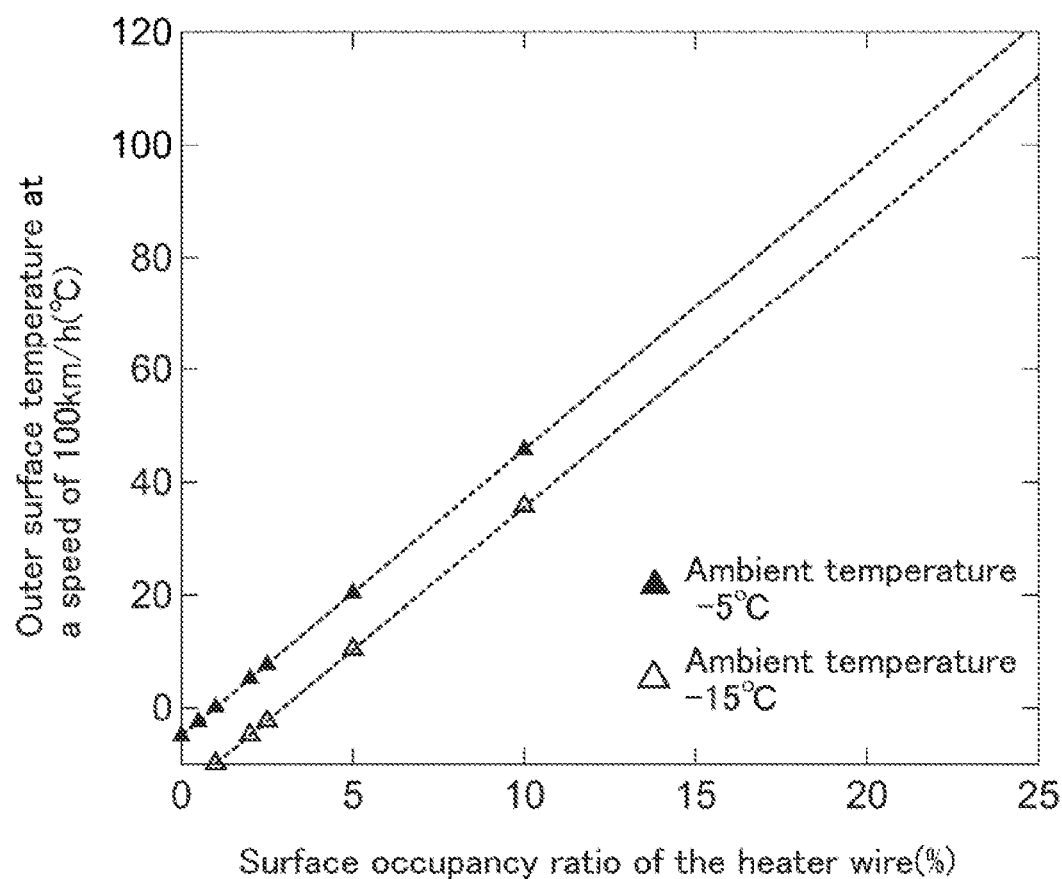
FIG. 9 is a graph of an experimental example showing the relationship between the surface occupancy ratio of the heater wire and the outer surface temperature of the sample when the ambient temperature is −5° C. and when the ambient temperature is −15° C.

According to FIG. 9, when the ambient temperature was −5° C. and the vehicle traveled at a speed of 100 km/h, it can be seen that the temperature of the outer surface of the substrate 21 (the front surface in the vehicle traveling direction) can be kept above 0° C. when the surface occupancy ratio of the linear portions 2211 of the heater wire 221 in the electromagnetic wave irradiation region R of the substrate 21 was set to 1% or more. In addition, when the ambient temperature was −15° C. and the vehicle traveled at a speed of 100 km/h, it can be seen that the temperature of the outer surface of the substrate 21 (the front surface in the vehicle traveling direction) can be kept above 0° C. when the surface occupancy ratio of the linear portions 2211 of the heater wire 221 in the electromagnetic wave irradiation region R of the substrate 21 was set to 3% or more.

Figure 10:
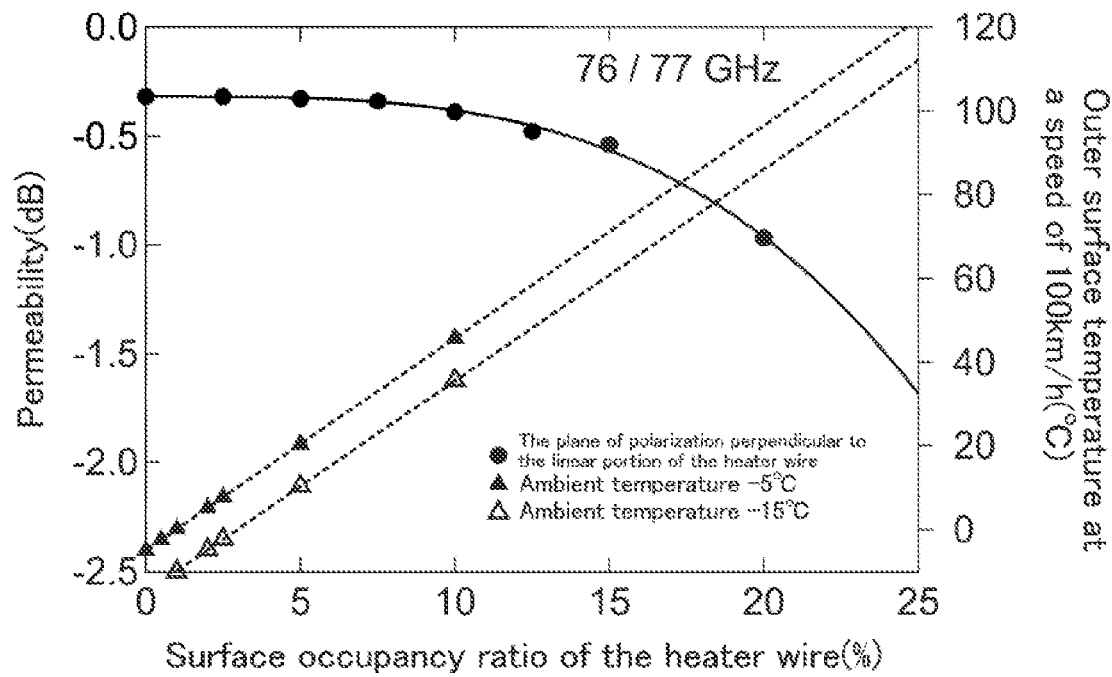
FIG. 10 a graph of an experimental example showing the relationship between the surface occupancy ratio of the heater wire, the electromagnetic wave permeability, and the outer surface temperature of the sample when the sample is irradiated with electromagnetic waves with the plane of polarization of linearly polarized electromagnetic waves perpendicular to the linear portion of the heater wire.

FIG. 10 shows the relationship between the surface occupancy ratio of the heater wire 221, the electromagnetic wave permeability, and the outer surface temperature of the sample 20 when the sample 20 was irradiated such that the plane of polarization LP of linearly polarized electromagnetic waves was perpendicular to the linear portion 2211 of the heater wire 221. In the structure in which the plane of polarization LP of linearly polarized electromagnetic waves is perpendicular to the linear portion 2211 of the heater wire 221, from the viewpoint of exhibiting a practical snow-melting function while satisfying the required electromagnetic wave permeability, the lower limit of the surface occupancy ratio of the heater wire 221 or the linear portion 2211 is preferably 1% or more, more preferably 3% or more, and the upper limit is preferably 24% or less, more preferably 20% or less. Furthermore, in order to obtain excellent electromagnetic wave permeability, the upper limit of the surface occupancy ratio of the heater wire 221 or the linear portion 2211 is more preferably 10% or less, and furthermore preferably 7.5% or less.

Figure 11:
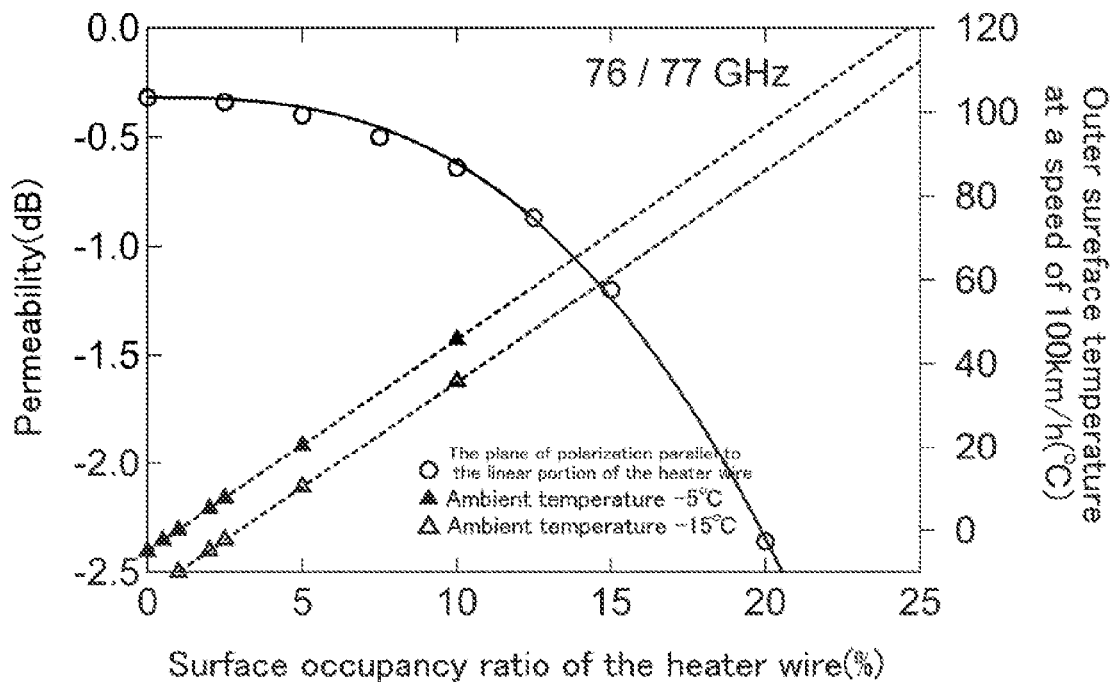
FIG. 11 is a graph of an experimental example showing the relationship between the surface occupancy ratio of the heater wire, the electromagnetic wave permeability, and the outer surface temperature of the sample when the sample is irradiated electromagnetic waves with the plane of polarization of linearly polarized electromagnetic waves parallel to the linear portion of the heater wire.

FIG. 11 shows the relationship between the surface occupancy ratio of the heater wire 221, the electromagnetic wave permeability, and the outer surface temperature of the sample 20 when the sample 20 was irradiated such that the plane of polarization LP of linearly polarized electromagnetic waves was parallel to the linear portion 2211 of the heater wire 221. In the structure in which the plane of polarization LP of linearly polarized electromagnetic waves is parallel to the linear portion 2211 of the heater wire 221, from the viewpoint of exhibiting a practical snow-melting function while satisfying the required electromagnetic wave permeability, the lower limit of the surface occupancy ratio of the heater wire 221 or the linear portion 2211 is preferably 1% or more, more preferably 3% or more, and the upper limit is preferably 16% or less, more preferably 13% or less.

[Scope of Inclusion of Invention Disclosed in Present Specification]

The invention disclosed in the present specification includes each invention and each embodiment, and, within an applicable range, an invention specified by changing a partial configuration thereof to another configuration disclosed in the present specification, an invention specified by adding another configuration disclosed in the present specification to the configuration thereof, and an invention obtained by reducing, specifying and highly conceptualizing the partial configuration thereof as long as a partial effect is acquired. The invention disclosed in the present specification includes the following modified embodiments and postscripts.

For example, the radome for vehicle-mounted radar devices of the present invention suitably includes a radome including a base body having an electromagnetic wave permeable substrate and a heater wire laminated on an inner surface side of the substrate and wired in a surface direction of the substrate. For example, the radome also includes a radome having a structure in which the heater sheet 4 is not used and a heater wire is laminated on the inner surface side of the substrate and directly fixed thereto.

INDUSTRIAL APPLICABILITY

The present invention can be used as a radome for vehicle-mounted radar devices and a vehicle-mounted radar structure.

REFERENCE SIGNS LIST

1 Radome for vehicle-mounted radar devices
2 Base body
3 Substrate
31 Back surface
4 Heater sheet
41 Heater wire
411, 411m, 411n Linear portion
42 Insulating film
5 Adhesive layer
6 Connector
71 Back substrate 72 Decorative layer
73 Transparent substrate
10 Vehicle-mounted radar device
20 Sample
21 Substrate
22 Heater seat
221 Heater wire
2211 Linear portion
2212 Terminal
222 Insulating film
23 Double-sided tape
101 Electromagnetic wave transmitter
102 Receiver
103 Evaluation device
R Electromagnetic wave irradiation region
P Pitch between linear portions of heater wire
W Line width of linear portion of heater wire
EW Propagation direction of millimeter waves
LP Plane of polarization of linearly polarized waves (polarization direction)

The invention claimed is:

1. A radome for vehicle-mounted radar devices, comprising:
a base body having an electromagnetic wave permeable substrate and a heater wire laminated on an inner surface side of the substrate and wired in a surface direction of the substrate, the substrate being disposed in front of a vehicle-mounted radar device arranged on a center side of a vehicle and the inner surface side of the substrate being the center side of the vehicle, wherein
linear portions of the heater wire are arranged side by side at intervals in the surface direction of the substrate in an electromagnetic wave irradiation region of the substrate, and
a surface occupancy ratio of the linear portions of the heater wire in the electromagnetic wave irradiation region of the substrate is set to 1% or more and 24% or less,
wherein
the radome further comprises a heater sheet including the heater wire and an electromagnetic wave permeable insulating film,
the heater sheet is laminated on and fixed to the inner surface side of the substrate such that the heater wire is placed,
a refractive index defined based on complex permittivity of the insulating film matches the refractive index defined based on complex permittivity of the substrate, or a refractive index defined based on complex permittivity of the insulating film is substantially the same as the refractive index defined based on complex permittivity of the substrate,
the linear portions of the heater wire are arranged side by side so as to extend substantially perpendicularly to a plane of polarization of linearly polarized electromagnetic waves irradiated by a vehicle-mounted radar device,
the insulating film is welded and fixed to the substrate.

2. The radome for vehicle-mounted radar devices according to claim 1, wherein
the surface occupancy ratio of the linear portions of the heater wire in the electromagnetic wave irradiation region of the substrate is set to 3% or more and 20% or less.

3. The radome for vehicle-mounted radar devices according to claim 2, wherein
the surface occupancy ratio of the linear portions of the heater wire in the electromagnetic wave irradiation region of the substrate is set to 3% or more and 7.5% or less.

4. The radome for vehicle-mounted radar devices according to claim 1, wherein
the heater wire is wired to be turned back in a meandering manner, and directions of currents flowing through the linear portions of the adjacent heater wires are substantially anti-parallel to each other, and
at least four linear portions of the heater wire are arranged side by side at a similar pitch in the electromagnetic wave irradiation region of the substrate.

5. A vehicle-mounted radar structure comprising:
the radome for vehicle-mounted radar devices according to claim 4; and
a vehicle-mounted radar device that irradiates the radome for vehicle-mounted radar devices with linearly polarized electromagnetic waves.

6. The radome for vehicle-mounted radar devices according to claim 1, wherein
the heater wire is wired so as to be turned back in a meandering manner, and directions of currents flowing through the linear portions of the adjacent heater wires are substantially anti-parallel to each other,
linear portions of the heater wire inside the electromagnetic wave irradiation region and linear portions of the heater wire outside the electromagnetic wave irradiation region adjacent to the linear portions are provided at a pitch similar to a pitch between the linear portions of the heater wire inside the electromagnetic wave irradiation region, and
the linear portions of the heater wire outside the electromagnetic wave irradiation region extend by a length equal to or longer than a length in the electromagnetic wave irradiation region of the adjacent linear portions of the heater wire inside the electromagnetic wave irradiation region.

7. A vehicle-mounted radar structure comprising:
the radome for vehicle-mounted radar devices according to claim 6; and
a vehicle-mounted radar device that irradiates the radome for vehicle-mounted radar devices with linearly polarized electromagnetic waves.

8. A vehicle-mounted radar structure comprising:
the radome for vehicle-mounted radar devices according to claim 1; and
a vehicle-mounted radar device that irradiates the radome for vehicle-mounted radar devices with linearly polarized electromagnetic waves.

9. A radome for vehicle-mounted radar devices, comprising:
a base body having an electromagnetic wave permeable substrate and a heater wire laminated on an inner surface side of the substrate and wired in a surface direction of the substrate, the substrate being disposed in front of a vehicle-mounted radar device arranged on a center side of a vehicle and the inner surface side of the substrate being the center side of the vehicle, wherein
linear portions of the heater wire are arranged side by side at intervals in the surface direction of the substrate in an electromagnetic wave irradiation region of the substrate, and
wherein the radome further comprises a heater sheet including the heater wire and an electromagnetic wave permeable insulating film, the heater sheet is laminated on and fixed to the inner surface side of the substrate such that the heater wire is placed, a refractive index defined based on complex permittivity of the insulating film matches the refractive index defined based on complex permittivity of the substrate, or a refractive index defined based on complex permittivity of the insulating film is substantially the same as the refractive index defined based on complex permittivity of the substrate, the linear portions of the heater wire are arranged side by side so as to extend substantially parallel to a plane of polarization of linearly polarized electromagnetic waves irradiated by a vehicle-mounted radar device, and a surface occupancy ratio of the linear portions of the heater wire in the electromagnetic wave irradiation region of the substrate is set to 1% or more and 16% or less, the insulating film is welded and fixed to the substrate.

10. The radome for vehicle-mounted radar devices according to claim 9, wherein
the surface occupancy ratio of the linear portions of the heater wire in the electromagnetic wave irradiation region of the substrate is set to 3% or more and 13% or less.

11. The radome for vehicle-mounted radar devices according to claim 9, wherein
the heater wire is wired to be turned back in a meandering manner, and directions of currents flowing through the linear portions of the adjacent heater wires are substantially anti-parallel to each other, and
at least four linear portions of the heater wire are arranged side by side at a similar pitch in the electromagnetic wave irradiation region of the substrate.

12. The radome for vehicle-mounted radar devices according to claim 9, wherein
the heater wire is wired so as to be turned back in a meandering manner, and directions of currents flowing through the linear portions of the adjacent heater wires are substantially anti-parallel to each other,
linear portions of the heater wire inside the electromagnetic wave irradiation region and linear portions of the heater wire outside the electromagnetic wave irradiation region adjacent to the linear portions are provided at a pitch similar to a pitch between the linear portions of the heater wire inside the electromagnetic wave irradiation region, and
the linear portions of the heater wire outside the electromagnetic wave irradiation region extend by a length equal to or longer than a length in the electromagnetic wave irradiation region of the adjacent linear portions of the heater wire inside the electromagnetic wave irradiation region.

13. A vehicle-mounted radar structure comprising:
the radome for vehicle-mounted radar devices according to claim 9; and
a vehicle-mounted radar device that irradiates the radome for vehicle-mounted radar devices with linearly polarized electromagnetic waves.

14. A radome for vehicle-mounted radar devices, comprising:
a base body having an electromagnetic wave permeable substrate and a heater wire laminated on an inner surface side of the substrate and wired in a surface direction of the substrate, the substrate being disposed in front of a vehicle-mounted radar device arranged on a center side of a vehicle and the inner surface side of the substrate being the center side of the vehicle, wherein linear portions of the heater wire are arranged side by side at intervals in the surface direction of the substrate in an electromagnetic wave irradiation region of the substrate, and a surface occupancy ratio of the linear portions of the heater wire in the electromagnetic wave irradiation region of the substrate is set to 1% or more and 24% or less, wherein the radome further comprises a heater sheet including the heater wire and an electromagnetic wave permeable insulating film, the heater sheet is laminated on and fixed to the inner surface side of the substrate such that the heater wire is placed, a refractive index defined based on complex permittivity of the insulating film matches the refractive index defined based on complex permittivity of the substrate, or a refractive index defined based on complex permittivity of the insulating film is substantially the same as the refractive index defined based on complex permittivity of the substrate, the linear portions of the heater wire are arranged side by side so as to extend substantially perpendicularly to a plane of polarization of linearly polarized electromagnetic waves irradiated by a vehicle-mounted radar device, the insulating film is fixed to the substrate via an adhesive layer, a refractive index defined based on complex permittivity of the adhesive layer matches the refractive indices defined based on complex permittivity of the insulating film and the substrate, or a refractive index defined based on complex permittivity of the adhesive layer is substantially the same as the refractive indices defined based on complex permittivity of the insulating film and the substrate.

15. A radome for vehicle-mounted radar devices, comprising:
a base body having an electromagnetic wave permeable substrate and a heater wire laminated on an inner surface side of the substrate and wired in a surface direction of the substrate, the substrate being disposed in front of a vehicle-mounted radar device arranged on a center side of a vehicle and the inner surface side of the substrate being the center side of the vehicle, wherein linear portions of the heater wire are arranged side by side at intervals in the surface direction of the substrate in an electromagnetic wave irradiation region of the substrate, and wherein the radome further comprises a heater sheet including the heater wire and an electromagnetic wave permeable insulating film, the heater sheet is laminated on and fixed to the inner surface side of the substrate such that the heater wire is placed, a refractive index defined based on complex permittivity of the insulating film matches the refractive index defined based on complex permittivity of the substrate, or a refractive index defined based on complex permittivity of the insulating film is substantially the same as the refractive index defined based on complex permittivity of the substrate, the linear portions of the heater wire are arranged side by side so as to extend substantially parallel to a plane of polarization of linearly polarized electromagnetic waves irradiated by a vehicle-mounted radar device, and a surface occupancy ratio of the linear portions of the heater wire in the electromagnetic wave irradiation region of the substrate is set to 1% or more and 16% or less, the insulating film is fixed to the substrate via an adhesive layer, a refractive index defined based on complex permittivity of the adhesive layer matches the refractive indices defined based on complex permittivity of the insulating film and the substrate, or a refractive index defined based on complex permittivity of the adhesive layer is substantially the same as the refractive indices defined based on complex permittivity of the insulating film and the substrate.

\* \* \* \* \*